INVENTOR
James Robinson

By Watson, Cole, Grindle & Watson

ELECTRIC CONTROL SYSTEM

INVENTOR
James Robinson
By Watson, Cole, Grindle & Watson

Patented Oct. 7, 1952

2,613,346

UNITED STATES PATENT OFFICE 2,613,346

ELECTRIC CONTROL SYSTEM

James Robinson, London, England

Application March 15, 1949, Serial No. 81,490
In Great Britain December 17, 1946

19 Claims. (Cl. 323—100)

Figure 1:
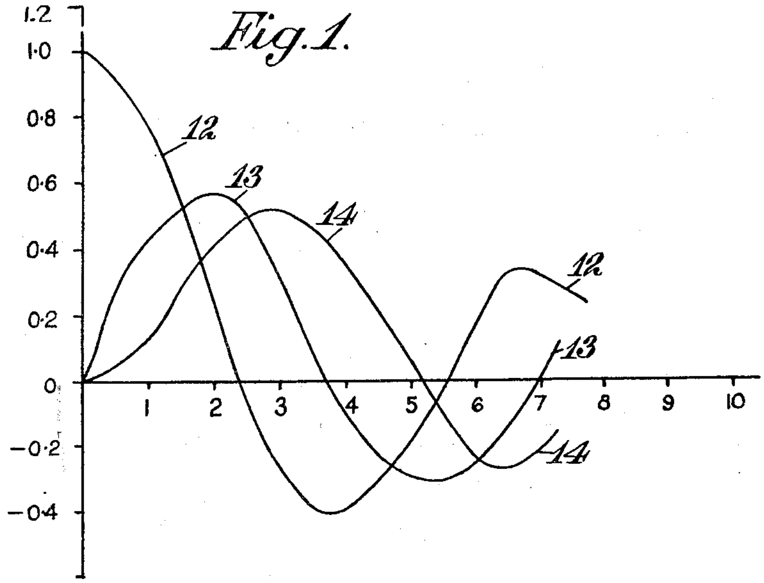

This invention relates to electric control systems involving the use of a particular A. C. signal which varies in accordance with the amplitude of one or more other A. C. signals in a non-linear manner and more particularly to an apparatus for deriving this A. C. signal.

In carrying out this invention there is employed modulation of the type in which there is produced a number of side bands the amplitude of which carries with the amplitude of the modulating signal in a non-linear manner.

There are a number of ways in which this type of modulation may be produced. For example, frequency or phase-modulation may be employed. It will be realised that when a carrier wave is frequency or phase-modulated, the relationship between the varying potentials of the resulting signal and the modulating signal is different in the different bands of the resulting spectrum of frequencies. Furthermore this relationship may be modified by varying the percentage modulation or the amplitude and/or frequency of the modulating signals. Also, it is to be noted that when two or more signals are arranged to frequency or phase-modulate a carrier, the amplitude of the resulting signal in any band of the sets of bands thereby produced is dependent on the amplitude of all the modulating signals.

Another way of producing this type of modulation is by applying the modulating wave to a distorting valve or like circuit e. g., a limiting circuit.

Another method of producing the desired type of modulation comprises adding a local oscillator signal to the A. C. signal or signals and applying the two sets of signals to a distorting valve or limiting circuit. The result includes a phase modulation of the carrier signal by the A. C. signal or signals and if the frequency of the carrier is different from that of A. C. signal or signals by a frequency lying within the I. F. band, the resultant signals from the distorting or limiting device will be I. F. signals.

Yet another way of producing the required side band signals is by pulse modulation.

In the present invention, use is made of any such method of modulation that produces a number of side bands, the amplitude of which vary with the amplitude of the modulating signal in a non-linear manner and one or more of the orders of the spectrum so produced are isolated to provide the desired control signals.

According to this invention, an electric control circuit comprises means for generating an A. C. signal having a characteristic depending on the value of a variable quantity; means for effecting modulation of an A. C. carrier with said signal so as to produce a number of side bands the amplitude of which varies with the characteristic of said signal in a non-linear manner; means for isolating the resultant signal in one of the frequency bands from the spectrum of frequency bands so produced; and means for employing said resultant signal as a controlling signal.

As has been indicated above, frequency or phase modulating means may be employed to obtain the required type of modulation.

The frequency band isolated from the spectrum may be the centre band of the spectrum of frequency bands produced by the modulation whereby for small deviation ratios there is obtained an A. C. output the amplitude of which varies approximately inversely with variations of the amplitude of the modulating signal.

Thus, in one arrangement, apparatus as described above and arranged to provide a control voltage varying in accordance with the variations of an alternating current input signal may comprise an oscillator valve, means for varying the frequency or phase of oscillation of the valve at the frequency of the input signal and to an extent in accordance with the amplitude of the input signal, and means for isolating a narrow band from the spectrum of frequency bands to obtain the required control voltage.

In this arrangement, frequency changing means may be provided for converting the frequency of the isolated signal to the frequency of the input signal.

In applying this arrangement as an automatic volume control circuit for radio apparatus or the like, the means for varying the frequency of the valve may comprise a variable reactance valve circuit so arranged that the frequency deviation ratios are small, for example 0.1 to 1.5 and means are provided for feeding back the output signal of the converted frequency to the input circuit in a predetermined phase relation to the input signal.

Thus, according to a feature of the invention, an automatic volume control circuit for radio apparatus and the like may comprise a tuned valve amplifying circuit, means for applying the signal to be controlled to the input of said amplifying circuit, means for periodically varying the frequency to which the amplifying circuit is resonant, which periodic variation is at a frequency less than the frequency of the input signal so that the output of the amplifying circuit is modulated at the lesser frequency, means for isolating one or more of the bands from the spectrum of frequency bands produced by the modulation, means for changing the frequency of the isolated band or bands of signals to the frequency of the signal to be controlled and means for feeding back the signal of changed frequency to the input of the amplifying circuit in a predetermined phase relation to the signal to be controlled.

The means for periodically varying the frequency to which the amplifying circuit is resonant may comprise a variable reactance valve circuit, the reactance of which is controlled by a signal derived from and of lower frequency than the aforesaid signal to be controlled.

Similar forms of automatic volume control circuits may be constructed using other forms of modulation producing the plurality of side bands e. g. pulse modulation or the harmonics produced by a distorting valve or the heterodyne envelopes and, in these cases, limiting may be used in place of feed-back.

The following is a more detailed description of a number of embodiments of the invention, reference being made to the accompanying drawings, in which—

Figure 1 is a graph showing how the amplitudes of side bands produced by a modulation vary with respect to the deviation ratio, and Figures 2 to 7 are circuit diagrams illustrating various embodiments of the invention.

Before describing specific examples of the use of this invention, the principle on which the invention is based will be described.

When a carrier wave $E=A \sin wt$ of frequency $w$ and amplitude A is frequency modulated by a modulating wave $b \sin pt$ of frequency $p$ and amplitude $b$, the instantaneous voltage of the resulting wave is $$e=A \sin (wt+D_f \cos pt)$$

where $D_f$ is the deviation ratio (D. R.) or the ratio of the variation of the carrier frequency from the average carrier frequency ($w$) to the modulating frequency ($p$). $D_f$ varies directly with the amplitude $b$ of the modulating wave and inversely with modulating frequency $p$.

$e$ may be written as follows:

$$e=A\{(Bo(D_f) \cos wt+\sum_{r=1}^{\infty}B_r(D_f)[\cos (w+rp)t+(-1)^r \cos(w-rp)t]\}$$

where $B_r(D_f)$ is the Bessel function of $D_f$ of the first kind and the $r^{th}$ order.

Thus a frequency modulated wave consists of a centre band of the carrier frequency ($w$) and an infinite number of side-bands at either side of the centre band, each band separate from its neighbours by the frequency of the modulating wave. The amplitude of the waves in, say, the $r^{th}$ side band does not vary linearly with the amplitude $b$ of the modulating wave but instead varies with respect to the D. R. in a quasi-periodic manner, the side band amplitude being proportional to the Bessel function of the $r^{th}$ order of the deviation ratio.

Figure 1 illustrates the manner in which the amplitude of the side bands varies with the deviation ratio, the D. R. being plotted along the abscissa and the amplitude (as a fraction of the amplitude of the un-modulated carrier) along the ordinate. In this figure, the curve 12 is the amplitude of the centre band (frequency $w$), 13 is that of the first side bands (frequency $w\pm p$)

and 14 is that of the second side bands (frequency $w\pm 2p$).

From the curve 12, it will be seen that the amplitude in the centre band has initially a negative slope whereas curves 13 and 14 have initially positive slopes. It will also be seen that the centre band has a zero amplitude for some non-zero values of the D. R. In the first and second side bands, the amplitudes are zero for zero D. R. and are also zero for some other non-zero D. R.'s.

As is well known, phase-modulation is very similar to frequency-modulation. Thus if a carrier wave $A \sin wt$ is phase modulated by a modulating wave $b \sin pt$, the instantaneous voltage of the resulting modulated wave may be written as $$AB_o\{(D_p)\cos wt+\sum_{r=1}^{\infty}B_r(D_p)[\cos (w+rp)t+(-1)^r \cos(w-rp)t]\}$$

where $D_p$ is the phase-deviation which is dependent on the amplitude of the modulating signal. It will be seen that the expressions for phase- and frequency modulations are almost identical. The two modulations differ, however, in one great respect—in frequency modulation the D. R. is dependent on the modulating frequency and in phase-modulation this is not the case.

It is well known how to separate a single band from a spectrum of bands when the modulating frequency is constant (for example, it is common practice to suppress either the centre band or the centre band and one side band of an amplitude modulated wave to reduce the power consumption in amplitude modulation transmission). However, in frequency modulation, when the modulating frequency may vary within large limits the normal frequency discrimination methods may be useless. For example, if a carrier of 1 mc./s. is modulated with audio frequency signal (30 c./s. to 5 kc./s.), the discriminator must be capable of letting through frequencies between 1,000,030 and 1,005,000 c./s. for the first side band. However the second side band may include frequencies between 1,000,060 c./s. and 1,010,000 c./s. Hence the majority of the signals within the second side band will also be passed by the discriminator and the first side band will not be isolated.

In order to isolate completely the first side band, for example, the modulation band of 30 to 5000 c./s. is displaced to a band say 5030 to 10,000 c./s. by well known methods. The first side band will then have as limits 1,005,030 and 1,010,000 c./s. and the second side band will have limits 1,010,060 and 1,020,000 c./s. so that the second side falls entirely without the first side band and if the discriminator is arranged to pass only the frequencies of the first side band, the remaining bands of the spectrum will be suppressed.

A carrier wave may then be easily frequency or phase modulated by a modulating frequency and one of the resulting side bands isolated from the remainder. If a single fixed modulating frequency is employed, the output in the isolated side band will vary in a non-linear manner with the amplitude of the modulating signal.

It may readily be shown that a similar non-linearity occurs with the other forms of modulation hereinbefore mentioned. Thus, considering the case when a series of harmonics are produced by a distorting valve, when means exist to give the third harmonic of a carrier wave $A$ cos $wt$, it is found that there is produced a component $A^3 \cos^3 wt$ which can be resolved into components $$\frac{A^3}{4}\cos^3 wt$$

and $$\frac{3A^3}{4}\cos wt$$

Hence when the third harmonic exists, there is also produced an additional component of the fundamental frequency the amplitude of which does not vary linearly with that of original signal. More generally, the presence of certain harmonics changes the amplitude of the fundamental. Similar reasoning applies to the case of a modulated carrier wave.

This characteristic of non-linearity of an isolated side band may be used to good purpose in a number of diverse connections. The most important of these are the control of the condition of a body, electric signals and the like. Thus, for example, by suitable choice of the order to be isolated, an output signal can be made to fall as an input signal rises as is frequently required in control systems. It is also possible to obtain an output signal for feeding back to the input so as to reach a limiting value and it is thus possible to obtain a new type of limiting which is particularly applicable to the control of the amplitude of electrical signals. A further feature of these forms of control systems is that two different orders can be isolated having different laws relating their amplitudes to that of the input signal. This offers a number of possibilities e. g. the two isolated signals can have their frequencies brought to the same value and then can be used in opposition.

As an example of the application of the invention for control purposes there will first be considered a system in which a condition to be maintained at a constant value is represented by an A. C. signal having a constant frequency and amplitude varying in accordance with the value of the condition. This signal is made to modulate a carrier wave having a frequency considerably higher than that of the modulating signal and the centre band (for example) is isolated. By varying the modulating frequency or modulation constant the D. R. for any particular amplitude may be varied. The D. R. is so varied in this way that when the condition has the predetermined value, the output in the isolated band is zero. (From curve 12 of Figure 1 it will be seen that this will occur for a D. R. of 2.4 approximately.) The output from the centre band is then used to control the condition so that the output is zero. The condition will then automatically be maintained at the required value.

Thus, as an application of the invention, an A. C. voltage may be stabilised by means of the circuit illustrated in Figure 2 which embodies the system just previously described. It is assumed that a source 15 of constant frequency supplies a load 16 and that the voltage for the load must be kept constant.

17 is an oscillator valve having a tuned circuit 18 between cathode and grid. In parallel with tuned circuit 18 is applied the reactance valve 19 which, as is well known, when connected as shown acts as at reactance in parallel with the tuned circuit. This reactance is varied by varying the voltage on the screen grid. The voltage from source 15 is applied to screen grid of valve 19 so that the output from oscillator valve 17 is frequency modulated by the A. C. voltage in well known manner.

The frequency modulated output obtained from coil 20 coupled to the coil of tuned circuit 18 is amplified by valve 21 and applied to a selector 22 which isolates the centre band. As the modulating frequency is constant, it is not necessary to displace the modulation frequency before modulation. The output in the isolated band is passed to a frequency changer 23 where the frequency is reduced to that of source 15. This may be done by mixing the output from device 22 with a carrier having a frequency equal to the difference between the frequency of source 15 and the average frequency of oscillator valve 17. The output from frequency changer 23 is now applied to the secondary winding of a transformer 24, the primary winding of which is connected between source 15 and load 16 and the screen grid of valve 19.

The frequency modulation constant is adjusted by adjusting the constants associated with the reactance valve 19 until the output from device 23 is zero when the voltage of source 15 is at its correct value. If now, the voltage of source 15 falls (or rises), the D. R. falls (or rises) and the output of device 23 and the voltage induced into the primary of transformer 24 rises (or falls), effecting automatic regulation, the output from device 23 being arranged to be in the correct phase.

Figures 3, 4:
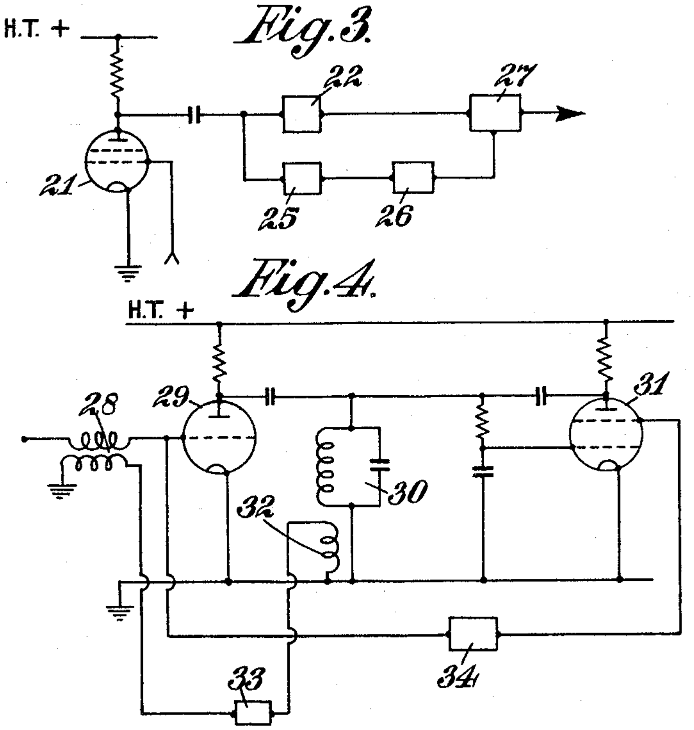

A convenient method of converting the frequency of the output from the isolator 22 to that of source 15 is illustrated in Figure 3. In the circuit shown in this figure, the amplified output from valve 21 (including the whole spectrum of frequency bands) is applied to the isolator 22 which isolates the centre band (frequency $w$) as before and also to isolator 25 which isolates the positive first side-band which has a frequency $(w+p)$ where $w$ and $p$ are respectively the average frequency of oscillator valve 17 and the frequency of source 15. The output from isolator 25 is preferably limited in limiter 26 and mixed with the output from isolator 22 in mixer 27. The resulting voltage has the same frequency as that of source 15 and is applied to transformer 24 as before.

Figure 2:
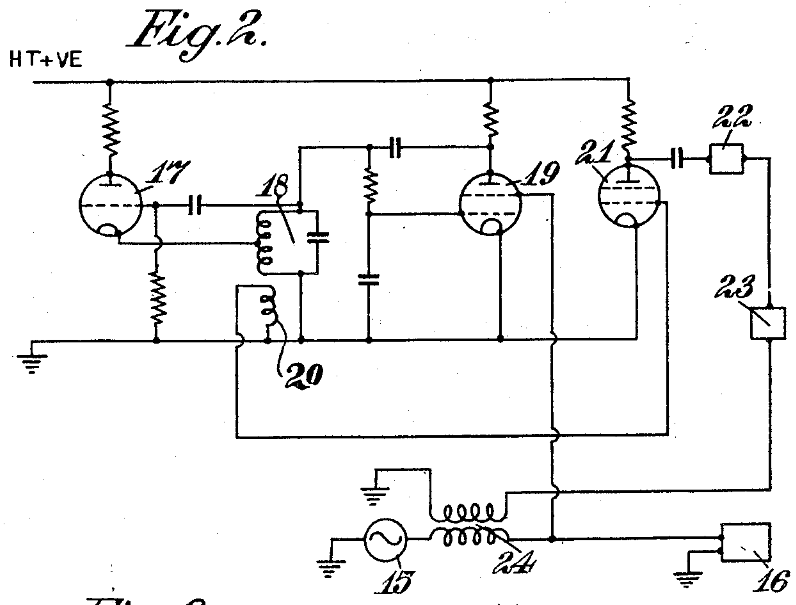

In some cases, it may be advantageous to obtain a D. C. controlling voltage. For example, the voltage from source 15 may be controlled by a D. C. variable inductance or transductor which is in turn controlled by the said D. C. controlling voltage. In this case the output from isolator 22 of Figure 2 is mixed in a mixer valve with a signal of the carrier frequency advanced in phase by angle $\alpha$. Thus, a part of the output from isolator 22 may be applied to a phase changer and mixed with another part of the output from isolator 22. The resultant signal is then $K \cos wt \cos (wt+\alpha)$ where K depends on the voltage of source 15. This may be written $$\frac{K}{2}\cos(2wt+\alpha)+K/2\cos\alpha$$

Hence if the output from the mixer is passed through a choke to remove the A. C. component, a D. C. signal which varies in the required manner with the voltage of the device 15 will be produced.

When convenient, control of the voltage to be maintained constant may be effected by using the D. C. control voltage referred to above to bias an amplifying valve for the controlled voltage. The D. C. control voltage is derived from the amplified output in the manner described above.

It will be appreciated that the control systems described may be used to maintain constant a voltage of any frequency. Thus they may be used to stabilise the main voltage applied to a sensitive piece of apparatus or may be used in radio circuits.

It will also be appreciated that the systems described above may be used for maintaining at a datum value other functions besides the voltage of an A. C. supply provided that (a) it is possible to generate an A. C. voltage having a constant frequency and an amplitude varying in accordance with the value of the condition, and (b) it is possible to control the value of the condition in accordance with the value of an A. C. or D. C. voltage.

For example, suppose it is desired to maintain the temperature of a furnace at a predetermined value. A resistance element embedded in the furnace wall is supplied with an alternating current so that the magnitude of the voltage across the element varies in accordance with the temperature. This voltage is used to frequency modulate a carrier wave as hereinbefore described and the resulting control A. C. or D. C. voltage made to control an electric motor controlling the injection of fuel into the furnace to maintain the temperature constant.

In the above examples of stabilisation, since the modulating frequency is constant, it does not matter whether frequency modulation, as described, or alternatively phase-modulation is used.

The circuits illustrated in Figures 2 and 3 may be used in radio circuits to maintain any desired signal level, i. e. as volume control circuits. The level may be adjusted by adjusting one of the values of the components associated with the variable reactance valve 19.

The circuits illustrated in Figures 2 and 3 may again be used with suitable modifications for the automatic volume control in radio circuits. The circuit is arranged so that the D. R.'s are small (e. g. of the order of 0.1 to 1.5) and the output of the zero order is again isolated and fed back to the input through transformer 24. In this case, however, the feed-back through transformer 24 is positive, i. e. the phase of the fed back signal is such as to increase the input signal. When connected in this way, the input to the circuit will increase, owing to the positive feed-back, but as the D. R. rises the output tends to fall. The input will therefore rise to an asymptotic value which corresponds to a value of the D. R. less than the critical value 2.4. The circuit will thus operate to maintain the input voltage and hence the voltage applied to load 16 at this value.

An alternative A. V. C. system is illustrated in Figure 4. In this case the voltage to be stabilised is applied through the primary winding of transformer 28 to the control grid of an amplifying triode 29 which has a turned circuit 30 between cathode and anode. A variable reactance valve 31 is connected across the tuned circuit so that the resonant frequency of the tuned circuit may be varied by varying the voltage applied to the screen grid of valve 31. This voltage may be produced locally, or alternatively we can use a derivative of the incoming waves for this purpose as described below. The output from the tuned circuit is picked up by coil 32 coupled to the coil of tuned circuit 30 and applied through an isolator 33. A part of the input signal is applied to a frequency changer 34, which considerably reduces the frequency and the output from this device applied to the screen grid of valve 31. The resonant frequency of tuned circuit 30 is thus wobbled in accordance with a derivative of the input signal. This process of wobbling produces amplitude and phase change, and results in a spectrum of bands which is similar to that produced by frequency modulation. Isolator 33 isolates the central band. It will be appreciated that if the change in frequency of the tuned circuit is very large the resultant output is equivalent to pulse modulated waves.

If the input signal is $A \cos wt$, the signal applied to the screen grid of valve 31 is $kA \cos vt$ where $v$ is considerably smaller than $w$ and the output from the isolator 33 will be $KAJ_0(k'A)$ where K is a constant and $k'$ is a parameter. Now if the input rises in amplitude, A increases and $J_0(k'A)$ decreases. Thus as the input continues to rise, the output from the isolator 33 will rise to an asymptotic or limited value. Since the phase shift caused by altering the resonant frequency of tuned circuit is small (e. g. 40°) the D. R. in this arrangement is also small and in fact has a maximum value of approximately 1.2.

If the output from isolator 33 is applied to the secondary of transformer 28 in the correct phase for positive feed back, the input will rise in amplitude until it reaches a value corresponding to the maximum value of the function $KAJ_0(k'A)$. Further increase of the input will result in a decrease of the feed back. Such a circuit has the advantage that a positive feed back is provided without the danger of instability which is usually associated with positive feed back.

If isolator 33 isolates the first side band only, the positive feed back will be proportional to $AJ_1(k''A)$. As the input rises, A rises and $J_1(k''A)$ rises until the D. R. reaches a value of approximately 2.0. Thus the input will increase to an asymptotic value corresponding to a D. R. of approximately 2.0. Similarly other side bands of the spectrum produced may be used.

A similar result is produced by reducing the frequency of the incoming signal and using the reduced frequency signal to frequency modulate a higher frequency local carrier, the frequency of which is different from that of the incoming signal. This frequency modulated carrier is then mixed with the incoming signal to provide a wave which is both amplitude and frequency modulated as before. In this case, however, it is necessary to ensure that the circuit gives D. R.'s of less than about 2.4 in order to ensure that operation remains in the appropriate part of the curve 12 of Figure 1.

Figure 5:
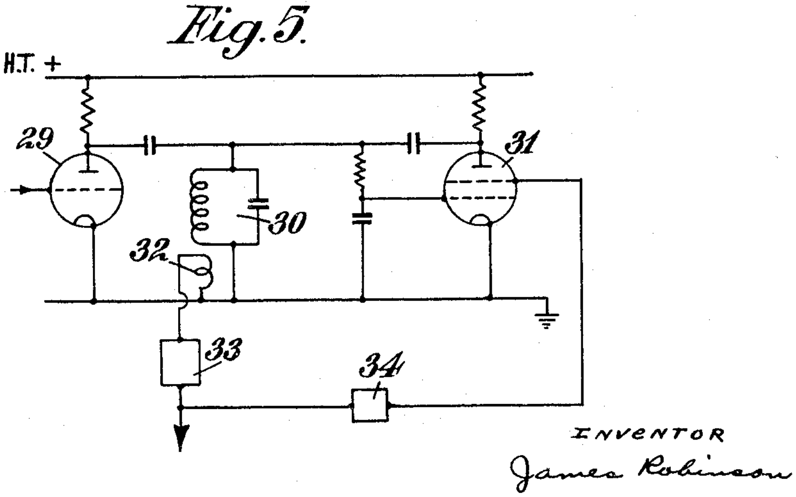

A modification of the circuit of Figure 4 for automatic volume control is illustrated in Figure 5. In this case the signal applied to the screen grid of valve 31 is in accordance with the output from the circuit. Thus, the output from coil 32 coupled to the inductance of tuned circuit 30 is passed through isolator 33 in which the central band is isolated, thence to the frequency changer 34 in which the frequency is greatly reduced and then to the screen grid of valve 31. In this case the D. R. depends on the output which itself depends on the D. R. initially the D. R. increases causing the output to decrease and hence to decrease the D. R. This results in a limiting effect and gives an automatic volume control. If the output from isolator 33 is fed back to the input of the circuit, or if accidental feed-back occurs the output will increase to an asymptotic value.

Figure 6:
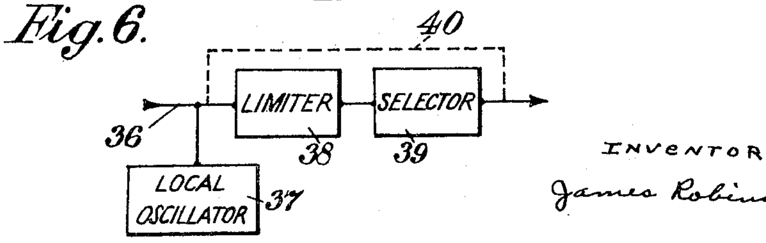

Figure 6 is a schematic diagram of a circuit for maintaining a signal at or below a predetermined level. In this figure, the input, being an A. C. carrier signal or a modulated A. C. signal, is applied to circuit 36. The local oscillator 37 emits an oscillator signal having a frequency different from the frequency of signal in channel 36 by an intermediate frequency, e. g. 30 kc./s. and the combined signals are applied to the input of the limiting device 38 which may be a limiting valve having a suitable bias applied to the grid. The output of the limiter 38 is fed to a selector 39 (e. g. a tuned circuit) where the first side band is isolated. This side band has the intermediate frequency and if A is amplitude of the signal applied to channel 36, the output from selector 39 has an amplitude $J_1(A)$. From a consideration of curve 13 of Figure 1 it will be seen that this output therefore has a maximum value for small deviation ratios and that its amplitude is limited.

If it is desired to maintain the amplitude of the output from selector 39 at the value corresponding to the maximum point of curve 13 of Figure 1, this output is positively fed back at the correct frequency through channel 40 to the input of the limiting device 38.

Figure 7:
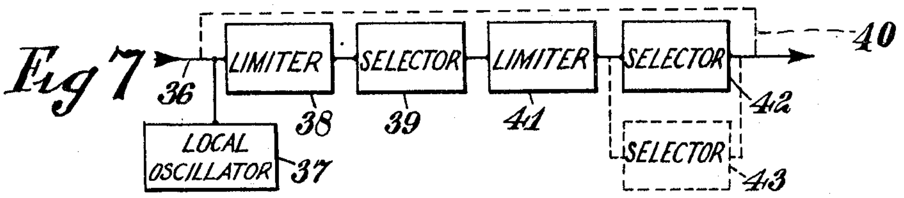

If the signal applied to channel 36 is such the deviation ratio of phase modulation effected by the limiting device 38 is so small (e. g. of the order of 0.5 or less) that the output from device 39 never approaches the maximum possible value and therefore the limiting effect of the circuit of Figure 6 is not employed, a harmonic of the output may be employed. As is well known, the deviation ratio of the $n$th harmonic is $n$ times the deviation ratio of the fundamental. This property may be usefully employed to bring the amplitude of the output to values near the maximum value. Thus, as shown in Figure 7, the output from selector 39 is applied to a second limiting device 41. The selector 42 then isolates the $n$th harmonic, $n$ being chosen so the deviation ratio is near the value corresponding to the curve 13 of Figure 1.

If it is desired to maintain the output from selector at the maximum value, the output from limiter 41 is also applied to selector 43 which isolates the $(n-1)^{th}$ harmonic. The outputs from selectors 42 and 43 are then mixed and a signal having the fundamental frequency results. This is fed back to the input of limiter 38 through channel 40 as before.

In the above examples where the modulating frequency is variable it may be necessary to provide tone correction to compensate for the fact that if the frequency increases the amplitude of the output decreases. If phase-modulation is used in place of frequency modulation this step is unnecessary.

I claim:

1. An electric control system comprising means for generating a first A. C. signal having a characteristic depending on the value of a variable quantity; means for effecting modulation of a second A. C. signal with said first signal so as to produce a number of separable side bands the amplitude of which varies with the characteristic of said first signal in a non-linear manner; means for isolating the resultant signal in one of the frequency bands from the spectrum of frequency bands so produced; and means for employing said resultant signal as a controlling signal.

2. An electric control system comprising means for generating a first A. C. signal, the amplitude of which varies in accordance with the value of a variable quantity; means for effecting modulation of a second A. C. signal with said first signal so as to produce a number of separable side bands, the amplitude of which varies with the amplitude of said first signal in a non-linear manner; means for isolating the resultant signal in one of the frequency bands from the spectrum of frequency bands so produced; and means for employing said resultant signal as a controlling signal.

3. An electric control system comprising means for generating an A. C. signal, the amplitude of which varies in accordance with the value of a variable quantity; means for frequency modulating an A. C. carrier with said A. C. signal; means for isolating the resultant signal in one of the frequency bands from the spectrum of frequency bands produced by said modulation; and means for employing said resultant signal as a controlling signal.

4. An electric control system comprising means for generating an A. C. signal, the amplitude of which varies in accordance with the value of a variable quantity; means for phase modulating an A. C. carrier with said A. C. signal; means for isolating the resultant signal in one of the frequency bands from the spectrum of frequency bands produced by said modulation and means for employing said resultant signal as a controlling signal.

5. Apparatus for controlling a first variable quantity in accordance with the value of a second variable quantity comprising means for generating an A. C. signal having an amplitude in accordance with the value of said second variable quantity, means for generating an A. C. carrier; means for modulating said carrier by said A. C. signal so as to produce a number of separable side bands the amplitude of which varies with the amplitude of said A. C. signal in a non-linear manner; means for isolating the resulting signal in the centre band from the spectrum of frequency bands so produced; and means for controlling said first variable quantity by said resultant signal.

6. Apparatus for maintaining a variable quantity at a datum value comprising means for generating an A. C. signal having an amplitude in accordance with the value of said variable quantity; means for generating an A. C. carrier; means for frequency modulating said carrier by said A. C. signal; means for isolating the resultant signal in the centre band of frequency bands produced by said modulation; and means for controlling the value of said variable quantity by said resultant signal.

7. Apparatus for providing a control voltage which varies in accordance with the variations of amplitude of an alternating current input signal in a non-linear manner comprising an electronic valve oscillator, means responsive to said input signal for varying the frequency of oscillation of the oscillator at the frequency of said input signal and to an extent in accordance with the amplitude of the input signal, means for separately isolating the resulting signals in two adjacent narrow bands of the spectrum of frequency bands in the oscillator output, means for mixing the two isolated signals to produce a beat signal of the frequency of said input signal, which beat signal provides the required control voltage.

8. Apparatus for deriving a D. C. control voltage the amplitude of which varies in accordance with the amplitude of at least one other A. C. controlling signal in a non-linear manner comprising a source providing an A. C. carrier, means for effecting modulation of the carrier with at least one other A. C. controlling signal so as to produce a number of side bands the amplitude of which varies with the amplitude of the modulating signal in a non-linear manner with the amplitude of the controlling signal, means for isolating the resulting signal in one of the frequency bands from the spectrum of frequency bands so produced, means for producing another signal of the same frequency as the isolated signal but displaced therefrom in phase, means for mixing the two signals of the same frequency and means for isolating the D. C. component of the mixed signals to provide the required D. C. control voltage.

9. Apparatus for providing a control voltage which varies in accordance with variations of amplitude of an alternating current input signal in a non-linear manner comprising an electronic valve oscillator having a tuned circuit including a variable reactance valve, means for applying the input signal to an electrode of the variable reactance valve so as to vary the frequency to which said tuned circuit is resonant, means for isolating the resulting signal in a narrow frequency band from the spectrum of frequency bands in the oscillator output which isolated signal provides the required control voltage.

10. An automatic volume control circuit for controlling the amplitude of an input signal comprising an electronic valve oscillator to provide a carrier wave, means for frequency modulating the carrier wave with the input signal such that the frequency deviation ratios are less than 1.5 means for isolating the resulting signal in a narrow frequency band from the spectrum of frequency bands in the modulated signal, frequency changing means for converting the isolated signal to the frequency of the input signal and means for feeding back the output signal of converted frequency to the input circuit in the same phase as the input signal.

11. An automatic volume control circuit for controlling an input signal comprising a tuned valve amplifier having input and output circuits, means for applying the signal to be controlled to the input circuit of the amplifier, means for periodically varying the frequency to which the amplifier is resonant, which periodic variation is at a frequency less than the frequency of the input signal so that the output of the amplifier is modulated at the lesser frequency, means for isolating the signals in one of the bands of the spectrum of frequency bands produced by the modulation, means for changing the frequency of the isolated band of signals to the frequency of the input signal and means for feeding back the signal of changed frequency to the input of the amplifying valve in the same phase as the input signal.

12. An automatic volume control circuit according to claim 11 wherein the means for periodically varying the frequency to which the amplifier is resonant comprises a variable reactance valve circuit, the reactance of which is controlled by a signal derived from and of lower frequency than the input signal.

13. An automatic volume control circuit according to claim 11 wherein the means for periodically varying the frequency to which the amplifier is resonant comprises a variable reactance valve circuit, the reactance of which is controlled by a signal derived from and of lower frequency than the output signal of said amplifying circuit.

14. Apparatus for producing a signal the amplitude of which varies with the amplitude of a controlling signal but does not exceed a predetermined value comprising a local oscillator, means for applying the controlling signal and the signal from the local oscillator to a device which gives an output the magnitude of which varies in a non-linear manner with the magnitude of the input applied thereto, whereby phase modulation of the local oscillator signal by the controlling signal is effected and means for isolating from the spectrum of frequency bands so produced a frequency band in which the amplitude/deviation ratio characteristic has a maximum value.

15. Apparatus for producing a signal the amplitude of which varies with the amplitude of a controlling signal but does not exceed a predetermined value comprising a local oscillator, means for applying the controlling signal and the signal from the local oscillator to a limiting device, whereby phase modulation of the local oscillator signal by the controlling signal is effected, means for isolating from the spectrum of frequency bands so produced a frequency band in which the amplitude/deviation ratio characteristic has a maximum value, and means for obtaining a harmonic of the signal in the isolated frequency band.

16. Apparatus as claimed in claim 15 in which the means for obtaining a harmonic comprises a second limiting device and means for isolating the desired frequency band.

17. Apparatus for deriving from a controlling A. C. signal a signal having a constant amplitude comprising a local oscillator means for applying the controlling signal and the signal from the local oscillator to a limiting device, whereby phase modulation of the local oscillator signal by the controlling signal is effected, means for isolating from the spectrum of frequency bands so produced a frequency band in which the amplitude/deviation ratio characteristic has a maximum value and means for positively feeding back at the correct frequency the signal in the isolated band to the input of the said limiting device.

18. Apparatus for deriving from a controlling A. C. signal a signal having a constant amplitude comprising a local oscillator means for applying the controlling signal and the signal from the local oscillator to a limiting device, whereby phase modulation of the local oscillator signal by the controlling signal is effected, means for isolating from the spectrum of frequency bands so produced a frequency band in which the amplitude/deviation ratio characteristic has a maximum value, means for obtaining a harmonic of the signal in the isolated band and means for positively feeding back at the correct frequency the said harmonic to the input of the said limiting device.

19. An automatic volume control circuit for controlling the amplitude of input signals in an audio frequency band comprising means for displacing the frequency band of said input signals so that the displaced band occupies a frequency range of less than two to one, an oscillator for producing an A. C. carrier having a frequency greater than the maximum frequency of the displaced band, means for modulating said A. C. carrier with said frequency displaced signals so as to produce a number of side bands, each having components corresponding to the whole of the displaced band, the amplitudes of which side bands vary with the amplitude of said frequency displaced signals in a non-linear manner, means for isolating the resultant signals in one of the side bands, frequency changing means for converting the isolated signals to the frequency of the input signal and means for feeding back the signal of converted frequency to the input in phase with the input signal.

JAMES ROBINSON.

REFERENCES CITED

The following references are of record in the file of this patent:

UNITED STATES PATENTS

| Number | Name | Date |
|---|---|---|
| 2,255,479 | Clarke | Sept. 9, 1941 |
| 2,379,484 | Haynes | July 3, 1945 |
| 2,385,212 | Konrad | Sept. 18, 1945 |
| 2,425,614 | Goddard | Aug. 12, 1947 |
| 2,465,809 | Lavender | Mar. 29, 1949 |

OTHER REFERENCES

"Radio Engineering," by Terman, 3rd edition, McGraw-Hill Book Company, Inc., 1947.